United States Patent [19]

Marto

[11] 4,317,325
[45] Mar. 2, 1982

[54] TIMING BELT ADJUSTMENT MECHANISM

[75] Inventor: John H. Marto, Oshkosh, Wis.

[73] Assignee: J. I. Case Comany, Racine, Wis.

[21] Appl. No.: 217,730

[22] Filed: Dec. 18, 1980

[51] Int. Cl.³ .................... A01D 69/00; A01D 55/26
[52] U.S. Cl. ........................... 56/11.6; 56/DIG. 22
[58] Field of Search ................... 56/11.6, 15.1, 15.2, 56/15.3, DIG. 22, 292

[56] References Cited

U.S. PATENT DOCUMENTS

| | | | |
|---|---|---|---|
| 2,285,230 | 6/1942 | Roberton | 56/11.6 |
| 2,348,612 | 5/1944 | Deacon | 56/292 |
| 2,823,507 | 2/1958 | Cooper et al. | 56/11.6 |
| 3,038,288 | 6/1962 | Deptula et al. | 56/11.6 |
| 3,136,106 | 6/1964 | Joslin | 56/116.22 |
| 4,231,215 | 11/1930 | Klas | 56/11.6 |

Primary Examiner—Paul J. Hirsch

Attorney, Agent, or Firm—Cullen, Sloman, Cantor, Grauer, Scott & Rutherford

[57] ABSTRACT

A belt tension and timing adjustment mechanism particularly for the timing belt of a lawn mower or the like having a plurality of rotary cutting blades. One rotary blade is mounted to the mower deck by a mounting plate having a plurality of bolts. The deck includes an aperture which closely receives one of the bolts, which defines a pivot axis, and the remaining bolts are received in elongated slots for pivotal movement of the rotary blade assembly to adjust the tension in the belt. The plate is rotated on the pivot axis by an adjustment bolt assembly having a bolt received through integral tabs on the adjustment plate and deck. The plate is spring biased by a spring and spacer assembly on the bolt against the tension of the belt, wherein the correct belt tension is indicated by the space between the adjustment bolt head and the plate tab, making belt tension adjustments simple and accurate.

5 Claims, 4 Drawing Figures

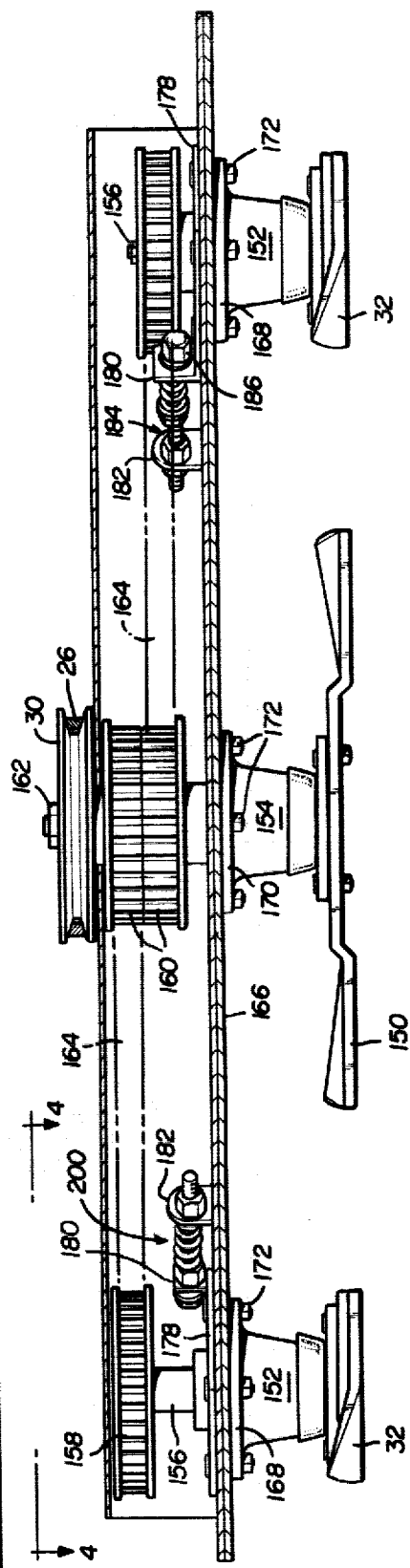
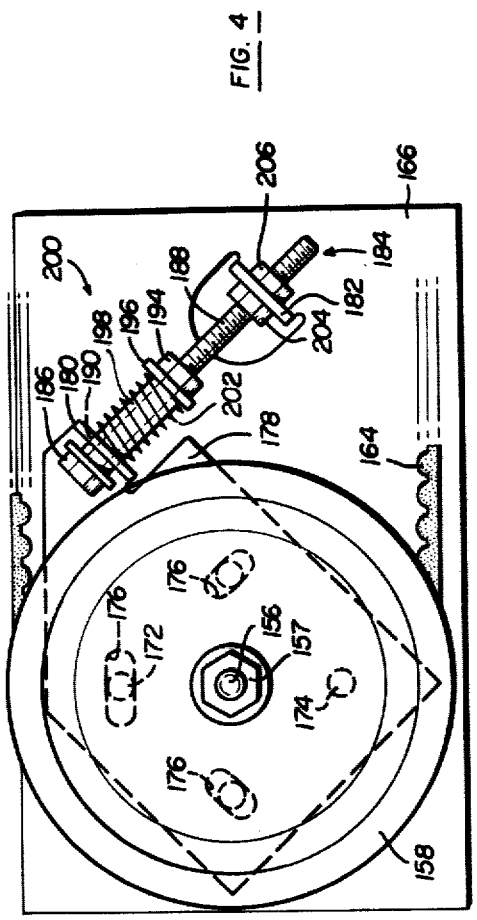
FIG. 3
FIG. 4

TIMING BELT ADJUSTMENT MECHANISM

FIELD OF THE INVENTION

The present invention relates to improvements in timing belt adjustment mechanisms, particularly adjustment mechanisms for the timing belt of a rotary mower having a plurality of blades with overlapping cutting paths. The timing belt adjustment mechanism of this invention pivotally adjusts the blade and spindle assembly of one blade relative to the other to adjust the tension in the timing belt.

DESCRIPTION OF THE PRIOR ART

Tractor mounted mowers of the general type disclosed herein are now common in the industry. The mower assembly is generally suspended beneath the tractor on a linkage which permits vertical adjustment of the mower to adjust the cutting height of the rotary blades. In a belt driven mower of this type, an endless drive belt is received around the power take-off pulley of the tractor and a driven pulley of the mower. Drive belt tension may be maintained by a spring actuated idler sheave assembly which receives the drive belt.

The prior art includes mower assemblies having a plurality of spaced horizontal rotary blades which rotate on vertical axes having overlapping cutting paths to provide a uniform cutting swath. The blades are rotatably mounted in a bearing housing on a shaft. The bearing housings are usually mounted on a horizontal mower deck with the shafts extending vertically through the deck in parallel relation. Each shaft includes an annular sprocket mounted thereon and a flexible timing belt is received around the sprockets to rotate the blades in timed relation. The drive sprocket of the rotary blades is generally mounted on the same shaft as the driven pulley of the mower which receives the drive belt. The mower may include three or more rotary blades, wherein each blade in addition to the first blade on the drive shaft is connected to the first blade by a timing belt.

As described above, the blades must rotate in timed relation to avoi contact of the blades in their overlapping rotational paths. Further, the tension of the timing belt is particularly important to avoid wear or slippage, which may result in blade to blade contact. It is often difficult to adjust the tension in the timing belt of the rotary mowers of the prior art. Generally, belt tension is adjusted by loosening the blade bearing housing mounting bolts, then attempting to hold the blade housing against the tension of the belt, while tightening the mounting bolts. More importantly, it is not possible to accurately gage the tension in the timing belt, except by "feel", which requires an experienced mechanic. Where the belt is too tight, the belt may wear excessively.

It is thus an object of the present invention to provide a simple and reliable timing belt adjustment mechanism, wherein the tension in the timing belt may be easily and accurately gaged and easily adjusted to the optimum tension.

SUMMARY OF THE INVENTION

As described above, the timing and tension adjustment mechanism of this invention is particularly adapted for adjustment of the timing belt of a lawn mower having a plurality of rotary cutting blades with overlapping cutting paths. The blades are rotatably mounted on generally vertical shafts each having a bearing housing mounted on the mower deck. The shafts extend through the deck, in generally parallel relation. An annular sprocket is mounted on each shaft and a flexible timing belt is received around the sprockets for rotating the blades in timed relation. The adjustment mechanism of this invention releases the tension in the timing belt for timing adjustment and accurately adjusts the tension in the belt to a predetermined optimum tension.

The timing and tension adjustment mechanism includes an adjustment plate overlying the mower deck and mounting one rotary blade assembly on the deck. In the disclosed embodiment, one of the blade bearing housings is attached to the mower deck by a plurality of mounting bolts. The mower deck includes a pivot aperture which closely receives one of the bearing housing mounting bolts and the deck includes a plurality of arcuate or elongated slots which receive the remaining mounting bolts. The deck aperture thus provides a pivot axis for rotation of the bearing housing around one of the bolts to adjust the tension in the timing belt.

In the preferred embodiment of the adjustment mechanism, the mower deck and the adjustment plate have integral opposed tabs having generally coaxially aligned apertures. An adjustment bolt having an enlarged head portion and a threaded shank is received through the aligned apertures in the tabs. A stop is provided on the bolt shank, between the tabs, and a tubular spacer is telescopically received on the adjustment bolt shank which engages the stop and is located between the bolt stop and the adjustment plate tab. The aperture in the adjustment plate tab permits the tubular spacer to pass freely therethrough, around the bolt shank and a compression coil spring is telescopically received around the spacer having opposed ends engaging the adjustment plate tab and the stop. A bolt adjustment means, such as a threaded nut, is received on the bolt and threadably biased against the deck tab to incrementally adjust the adjustment bolt longitudinally against the force of the compression spring. The compression spring thereby maintains the tension in the belt and the tension in the belt may be adjusted by rotating the nut on the adjustment bolt against the deck tab.

In the preferred embodiment, the tension in the timing belt is indicated by the space between the bolt head and the adjustment plate tab. When the tension in the belt is properly adjusted, the bolt head will be slightly spaced from the adjustment bolt tab. This space or gap may be accurately adjusted to the thickness of the ignition key or any convenient measurement. The gap is easily measured and maintained by adjustment of the nut or nuts on the adjustment bolt bearing against the deck tab. The tension in the belt is released for adjustment of the timing of the rotary blades by adjustment of the stop means, which may also be provided by a nut threadably received on the bolt shank and located between the adjustment plate and deck tab.

The timing and tension adjustment mechanism of this invention is thus simple in construction, yet reliable and accomodates a plurality of rotary cutting blades. Other advantages and meritorious features of the timing belt adjustment mechanism of this invention will be more fully understood from the following description of the preferred embodiments, the appended claims and the drawings, a brief description of which follows.

BRIEF DESCRIPTION OF THE DRAWINGS

FIG. 3 is a partial cross-sectional end view of FIG. 2, in the direction of view arrows 3—3, illustrating the timing belt adjustment mechanism of this invention; and FIG. 4 is a partial top view of the timing belt adjustment mechanism shown in FIG. 3, in the direction of view arrows 4—4.

DESCRIPTION OF THE PREFERRED EMBODIMENTS

Figure 1:
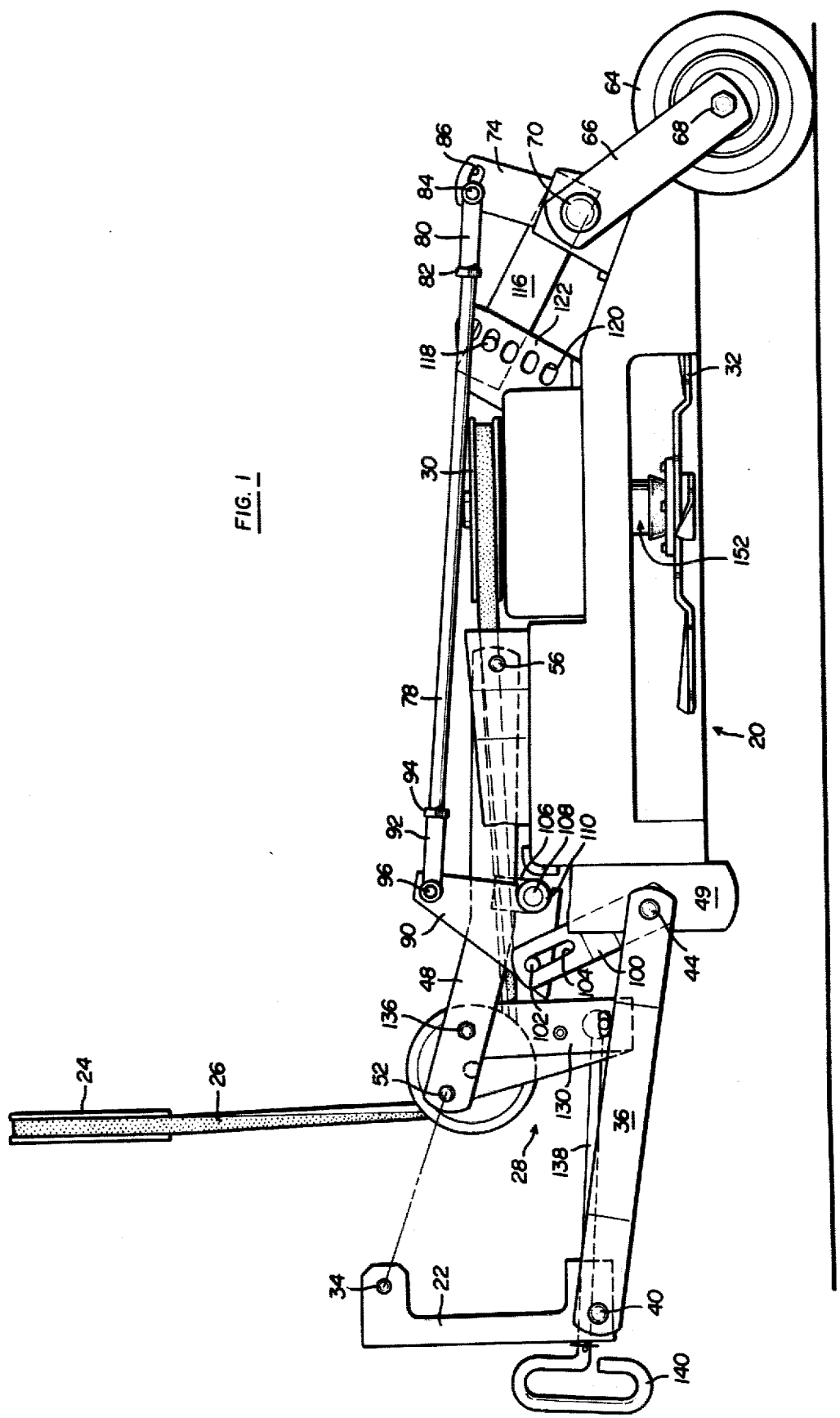
FIG. 1 is a side elevation of a rotary lawn mower suitable for the timing belt adjustment mechanism of this invention.

In the disclosed embodiment, the lawn mower assembly 20 is mounted beneath a tractor, not shown, on a drawbar suspension. The tractor may be a conventional lawn or garden type tractor having a horsepower range from about 5 to 20 HP, such as disclosed in the prior art. The tractor in the disclosed embodiment includes a C-shaped carriage hitch 22 and a power take-off pulley 24 which is mounted on the forward output shaft of the tractor, not shown. An endless drive belt 26 is received on the power take-off pulley 24 of the tractor, around the idler sheaves of the idler sheave assembly 28, and around the mower driven pulley 30, to drive the rotary mower blade 32. The tractor, which does not form a part of this invention, may be any conventional tractor. The details of the mower drawbar suspension and idler sheave assembly 28, which do not for a part of this invention, are more fully described in copending applications, Ser Nos. 217,617 and 217,718 filed Dec. 18, 1980, which are incorporated herein by reference.

The forward end of the mower assembly 20 is supported on a drawbar suspension, which includes two pair of parallel links. The power parallel links 36 and 38, are pivotally connected to the carriage hitch 22 at 40 and 42, respectively. The carriage hitch is attached to the forward end of the tractor by bolts or the like through apertures 34 in the carriage hitch. The rearward ends of the lower links 36 and 38 are pivotally connected to the mower frame 49 by pivotal connections 44 and 46, respectively. In the disclosed embodiment, the pivotal connections are provided by metal pins, which are received through apertures in the links and the tractor chassis or mower frame, and which are retained by cotter pins, not shown. The linkage may thus be easily disassembled, as required.

The parallel upper links 48 and 50 are pivotally connected to the tractor chassis at their forward ends by pins received through pivot aperture 52 and 54, respectively. The rearward ends of the upper parallel links are pivotally connected to mower frame member 60 by pivotal connections 56 and 58, respectively. As shown, the upper parallel links 48 and 50 are generally parallel to the lower parallel links 36 and 38, forming two pairs of parallelograms about which the forward end of the mower assembly may be raised or lowered.

Figure 2:
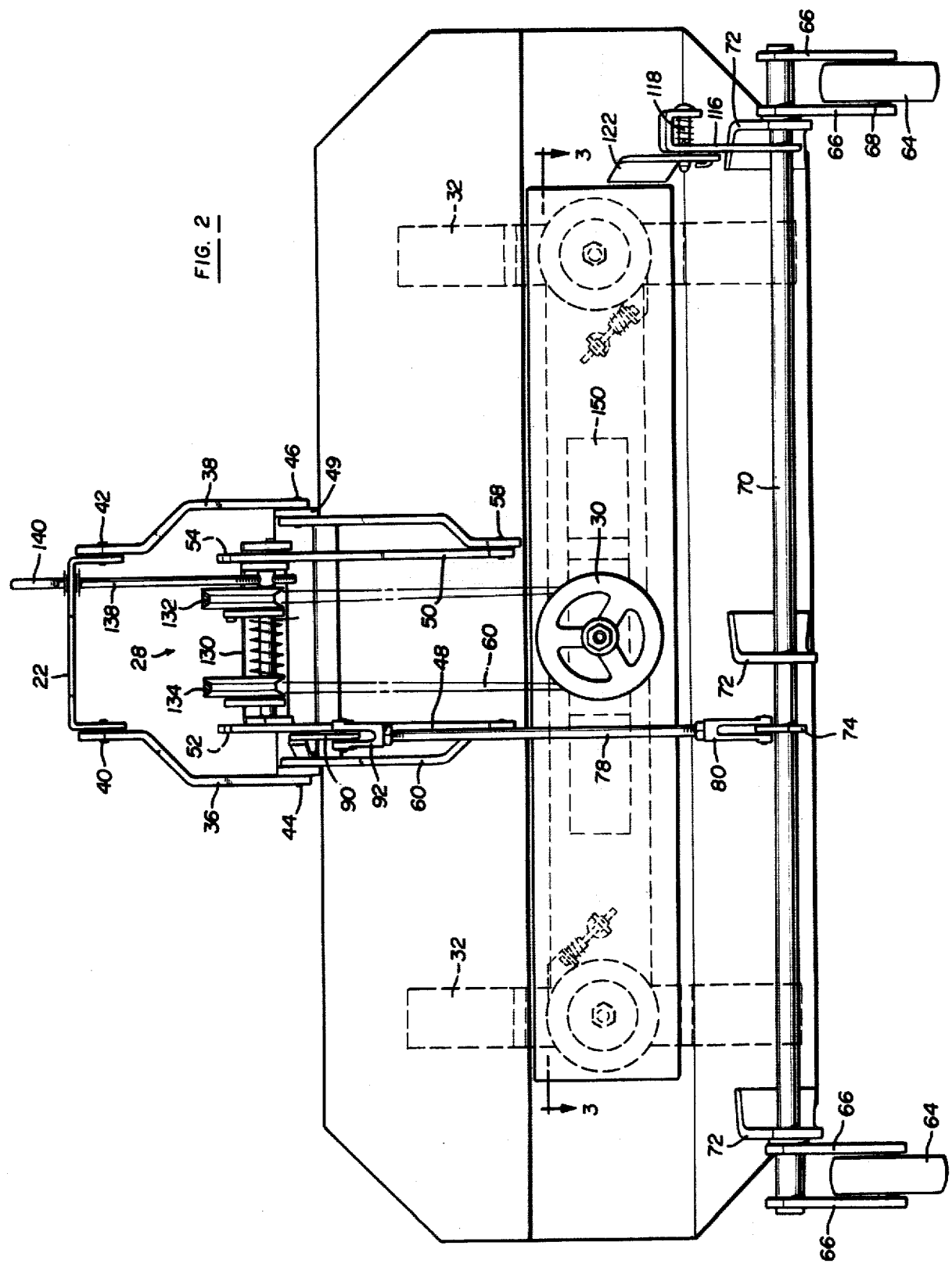
FIG. 2 is a top elevation of the rotary lawn mower of FIG. 1.

The rearward end of the mower assembly is supported on gage wheels 64. The gage wheels are rotatably supported on wheel support arms 66 by conventional bolt and bearing assemblies 68. The wheel support arms are connected to rock shaft 70, which is rotatably supported at the rearward end of the mower by brackets 72. The brackets are welded or otherwise secured to the mower frame, as best shown in FIG. 2. A lift arm 74 is connected to the rock shaft to form a bellcrank lever with the rock shaft and wheel support arms, such that rotation of the wheel support arms 66, about rock shaft 70, rotates the lift arm 74.

The lift arm 74 is operably connected to the drawbar linkage by a tie rod 78. The tie rod includes a rear clevis 80 which is threadably received on the rearward end of the tie rod and retained by nut 82. The clevis is pivotally connected to the upper free end of the lift arm 74 by pivot pin 84, which is received in an arcuate slot 86 to accomodate the rotational motion of the lift arm about rock shaft 70. The forward end of the tie rod is pivotally connected to a bellcrank lever 90 by clevis 92, which is threadably received on the forward end of the tie rod and retained by nut 94. The clevis is pivotally connected to the upper free end of the bellcrank by pivot pin 96. As described, above, the pivot pins in the disclosed embodiment are retained by cotter pins, not shown. The bellcrank lever 90 is pivotally connected to one of the upper parallel links 48 and one of the lower parallel links 36 to raise the forward end of the mower in parallel relation to the rearward mower end and maintain the rotary blades level for an even cut.

The bellcrank lever is connected by a leveler link 100 to the pivotal connection 44 between the lower link 36 and the mower frame member 49. The upper end of the leveler link is pivotally connected to the bellcrank lever by pin 102, which is received in a lost motion slot 104 in the leveler link. The lost motion slot will accomodate the arcuate motion of the bellcrank lever. The bellcrank lever is connected to one of the upper links 48 by a rectangular tab 106, which is welded or otherwise secured to the upper link 48. A pivot pin 108 is rotatably received in a bearing sleeve 110, which is secured to or integral with the tab 106. The bellcrank lever 90 is thus pivotally connected to one of the upper and lower parallel links, 48 and 36, respectively, and to the tie rod 78 at its free end. Longitudinal movement of the tie rod 78 will thus rotate the bellcrank lever to adjust the height of the forward end of the mower.

The mower is retained at one of five predetermined heights by height adjustment arm 116, which is secured to rock shaft 70. The free end of the height adjustment arm 116 is U-shaped, as shown in FIG. 2, and includes a spring biased lock pin 118 which is receiveable in one of the vertically spaced apertures 120 in the sector plate 122 attached to the mower chassis. The mower is raised or lowered by rotating wheel support arms 66 about rock shaft 70 to swing the gage wheels 64 beneath the rearward end of the mower to raise or lower the rearward end of the mower. As described more fully in the above referenced copending application, rotation of the wheel support arms 66 rotates the lift arm 74 and moves the tie rod 78 longitudinally to rotate bellcrank 90 and simultaneously raise or lower the forward end of the the mower, in parallel relation. The mower is retained at the desired height by the spring bolt 118.

As shown in FIGS. 1 and 2 and described more fully in the above referenced copending application filed concurrently herewith, the idler sheave assembly 28 maintains a constant tension in the drive belt 26 as the mower is raised or lowered. The idler sheave assembly is supported on a U-shaped bracket 130 and includes a fixed mule sheave 132 and a spring actuated rock sheave 134. The U-shaped idler sheave bracket is pivotally supported on the upper parallel links, 48 and 50, by pivot bolts 136, such that the idler sheave assembly moves vertically with the mower as the mower is raised or lowered. The tension in the drive belt is adjusted by rotation of adjustment screw 138 having a handle portion 140 at the forward end of the carriage hitch 22.

It will be understood that the lawn mower assembly 20 shown in FIGS. 1 and 2, including the drawbar suspension and idler sheave assembly, is merely illustrative of the type of rotary lawn mower suitable for the timing belt adjustment mechanism of this invention, which is disclosed in FIGS. 3 and 4. Further, the drawbar suspension and idler sheave assembly are more fully disclosed and claimed in separate copending applications, which are incorporated herein by reference.

The adjustment mechanism of this invention is adapted to adjust the timing and tension in a timing belt of a lawn mower having two or more rotary cutting blades. The disclosed embodiment of the lawn mower assembly includes two driven rotary blades 32 and a center blade 150. The blades are mounted on shafts 156 and 162 in spindle housings 152 and 154, respectively. Driven sprockets 158 are mounted on the outer rotary blade shafts and aligned with drive sprockets 160 mounted on the center blade shaft 162. The center blade shaft includes the driven pulley 30, which receives the drive belt 26 of the mower. The shafts 156 and 162 are splined and received in splined openings in the sprockets, such that the rotary blades 32 and 150 accurately rotate with the sprockets. The timing belts 164 are received around the sprockets and include ribs, as shown in FIG. 4, which are received in grooves in the sprockets, such that the outer sprockets 158 are accurately controlled by the center or drive sprockets 160.

The rotary blade assemblies are mounted on the generally horizontal mower deck 166. In the disclosed embodiment, the spindle housings 152 and 156 include an annular collar 168 and 170, respectively, which are attached to the mower deck by threaded bolts and nuts 172. The bolts, which are integral with adjustment plate 178, are received through openings in the mower deck 166 and the collars 168 and 170 of the spindle housings and secured by nuts 172.

In the preferred embodiment of the adjustment mechanism, the openings in the mower deck which receive the mounting bolts include a pivot aperture 174, which closely receives the mounting bolt, and a plurality of slots 176 which receive the remainder of the mounting bolts. The outer spindle housings 152 are thus permitted to rotate about pivot axes provided by apertures 174 to adjust the tension in the timing belt 164. For example, when the blade spindle housing 152 shown in FIG. 4 is rotated in a counter-clockwise direction about pivot aperture 174, the tension in the timing belt will be increased. The rotary blade assembly including the blade and spindle housing are retained in the set position by adjustment mechanism 200.

The adjustment mechanism includes the adjustment plate 178 and an integral tab 180 which is formed from an upturned portion of the adjustment plate. A generally parallel deck tab 182 is integrally struck from the upper plate of the mower deck 166. The tabs 180 and 182 include generally coaxially aligned apertures which receive an adjustment bolt 184 having an enlarged head portion 186 and a threaded shank portion 188. The adjustment bolt 180 includes and adjustable stop member, between the tabs, including a threaded nut 194 received on the threaded shank portion and an enlarged washer 196. A tubular spacer 198 is received on the threaded shank portion of the bolt between the washer 196 of the stop member and the enlarged head 186 of the shank. A coil spring 202 is compressed between the washer 196 of the stop member and the adjustment plate tab 180. As shown in FIG. 4, the diameter of the aperture 190 in the adjustment plate tab is large enough to permit the tubular spacer 198 to pass freely therethrough. The diameter of the spring 202 is greater than the aperture 190. The coil spring 202 is thus compressed between the adjustment plate tab 180 and the washer 196 of the stop member as the plate 180 is rotated.

The timing belt adjustment mechanism of this invention may be utilized to either release the tension in the timing belt 164, to adjust the timing between either of the outer rotary blades 32 and the center blade 150 and accurately adjust the tension in the timing belt. Further, the adjustment mechanism indicates the tension in the belt, as now described. The "timing" of the blades 32 and 150 is adjusted by loosening the blades spindle housing mounting bolts 172 and turning the nut 204 towards the compression of spring 202. The nut 204 will allow movement of the adjustment bolt to the right in FIG. 4 which permits rotation of adjustment plate 178 clockwise to loosen the tension in the timing belt 164. The blades 32 and 150 may then be rotated and adjusted, such that the blades extend at right angles, as shown, which will avoid any contact between the blades in their overlapping cutting paths.

The tension in the timing belt 164 is adjusted by threading nuts 204 and 206 which are threadably received on the threaded shank portion 188 of the adjustment bolt on opposite sides of the mower deck tab 182. The correct or preferred timing belt tension is indicated by the location of the adjustment bolt head 186 relative to the adjustment plate tab 180. When the bolt head is spaced from the tab 180, the compression of spring 202 biases the adjustment plate tab 180 to rotate the plate 178 in a counter-clockwise direction, against the tension in the timing belt 164, increasing the tension in the belt. When the bolt head 186 is correctly spaced from the tab 180, as shown in FIG. 4, the spring pressure equals or offsets the preferred belt tension. The preferred predetermined space may be set at any convenient or desired distance. For example, in the disclosed embodiment, the preferred distance between the bolt head and the tab is equal to the thickness of an ignition key.

When there is no gap between the bolt head 186 and tab 180 or when the gap is insufficient, the gap is set or increased by loosening nut 206 and threading nut 204 against tab 182. The nut moves bolt 188 to the left in FIG. 4, rotating adjustment plate 178 in a counterclockwise direction, increasing the tension in the belt. When the gap is greater than desired, nut 204 is threaded toward nut 194, moving adjustment bolt 188 to the right in FIG. 4, reducing the tension in the belt. When the desired gap is set, nut 206 is tightened against tab 182, locking the bolt in the correct position. The tension in the belt may thereafter be easily determined by gaging the distance between the bolt head 186 and tab 180. The belt tension is adjusted by threading nuts 204 and 206, as described above. When the proper timing belt tension is set, the nuts 172 are tightened and the spindle housings are locked on the mower deck.

The timing belt adjustment mechanism of this invention thus provides an indicator of belt tension and permits easy adjustment of the belt tension to avoid slippage or excessive wear in the timing belt. The adjustment mechanism is relatively simple in construction, yet reliable and accomodates three or more rotary cutting blades. It will be understood that various modifications may be made to the adjustment mechanism of this invention without departing from the preview of the appended claims.

I claim:

1. A timing and tension adjustment mechanism for the timing belt of a lawn mower, said mower having at least two rotary cutting blades, said blades each rotatably mounted in a bearing housing on a shaft comprising in combination a rotary blade assembly, said bearing housings mounted on a mower deck, said shafts extending through said deck is generally parallel relation, said shafts each having an annular sprocket mounted thereon and a flexible timing belt received around said sprockets rotating said blades in timed relation, said adjustment mechanism comprising: an adjustment plate overlying said deck mounting one rotary blade assembly on said deck, adjustment means adapted to rotate said adjustment plate and the mounted rotary blade assembly on a pivot axis to adjust the tension in said belt, said adjustment means including portions of said plate and said deck having generally coaxially aligned apertures, a threaded adjustment bolt having an enlarged head portion bearing against said adjustment plate portion and a threaded shank extending through said plate and deck portions, a stop on said bolt shank between said plate and deck portions, a tubular spacer telescopically received on said adjustment bolt shank engaging said stop and located between said bolt stop and said adjustment plate portion, said adjustment plate portion aperture having an internal diameter sufficient to permit said tubular spacer to pass freely therethrough around said bolt shank, a compression coil spring telescopically received around said spacer having opposite ends engaging said adjustment plate portion and said stop and means adjusting said bolt longitudinally against said deck portion to adjust said bolt longitudinally against the force of said compression spring, said compression spring thereby rotating said adjustment plate about said pivot axis to adjust the tension in said timing belt and the space between said adjustment bolt head and said plate portion indicating the tension in said timing belt.

2. The belt tensioning and timing adjustment mechanism defined in claim 1, characterized in that said one rotary blade assembly is mounted to said deck by a plurality of mounting bolts, said deck having one aperture closely receiving one of said mounting bolts defining said pivot axis and said deck having a plurality of elongated slots receiving the remainder of said mounting bolts permitting pivot movement of said rotary blade assembly about said pivot axis to adjust the tension of said belt.

3. The belt tension and timing adjustment mechanism defined in claim 1, characterized in that said adjustment bolt includes a nut threadably received on said shank biased against said deck portion to incrementally adjust said adjustment bolt longitudinally against the force of said compression spring.

4. The belt tension and timing adjustment mechanism defined in claim 3, characterized in that said deck and adjustment plate include integrally struck tab portions extending generally parallel and including coaxially aligned apertures defining said deck and adjustment plate portions, said adjustment bolt received through said deck and plate tab portion apertures.

5. A belt tension and timing adjustment mechanism for the timing belt of a lawn mower, said mower having at least two rotary cutting blades, said blades each rotatably mounted in a bearing housing on a shaft, said bearing housings attached to a mower deck by a plurality of mounting bolts, said shafts extending through said deck in generally parallel relation, said shafts each having an annular sprocket mounted thereon, and a flexible timing belt received around said sprockets rotating said blades in timed relation, said adjustment mechanism comprising: an adjustment plate overlying said deck securing said mounting bolts and bearing housings to said deck, said mower deck having a pivot aperture closely receiving one of said bearing housing mounting bolts defining a pivot point and a plurality of elongated slots receiving the remainder of said mounting bolts of one of said housings, said elongated slots permitting pivotal movement of said one bearing housing and shaft about said pivot point to adjust the tension in said timing belt, said deck having an integral tab extending generally perpendicular to said deck, said adjustment plate having an integral tab extending generally parallel to said deck tab in spaced relation, said tabs having generally coaxially aligned apertures, an adjustment bolt having an enlarged head portion for bearing against said adjustment plate tab and an elongated threaded shank extending through said adjustment plate tab and deck tab, a stop on said bolt shank between said tabs, a tubular spacer telescopically received on said adjustment bolt shank engaging said stop and located between said bolt stop and said adjustment plate tab, said adjustment plate tab aperture having an internal diameter sufficient to permit said spacer to pass freely therethrough around said bolt shank, a compression coil spring telescopically received around said spacer having opposite ends engaging said adjustment plate tab and said stop, and a nut on said adjustment bolt shank threadably biased against said deck tab to incrementally adjust said adjustment bolt longitudinally against the force of said compression spring, said compression spring thereby rotating said adjustment plate about said pivot point and adjusting the tension in said timing belt and the space between said adjustment bolt head and said adjustment plate tab providing an indication of the tension in said timing belt.

* * * * *